United States Patent [19]
Katayama

[11] Patent Number: 5,257,433
[45] Date of Patent: Nov. 2, 1993

[54] CLEANER FOR PIPING

[76] Inventor: Shinzou Katayama, Park-Komo 201, No. 15-10, Minaminagareyama 3-Chome, Nagareyama-shi, Chiba-Ken, 270-01, Japan

[21] Appl. No.: 908,115

[22] Filed: Jul. 2, 1992

[51] Int. Cl.⁵ .............................................. B08B 9/04
[52] U.S. Cl. .................................................. 15/104.12
[58] Field of Search ..................................... 15/104.12

[56] References Cited

U.S. PATENT DOCUMENTS

| 1,081,497 | 12/1913 | Goetz | 15/104.12 X |
| 1,549,761 | 8/1925 | Fuchs et al. | 15/104.12 |
| 3,525,112 | 8/1970 | Masters | 15/104.12 |

FOREIGN PATENT DOCUMENTS

| 419272 | 8/1974 | U.S.S.R. | 15/104.12 |
| 642025 | 1/1979 | U.S.S.R. | 15/104.12 |

*Primary Examiner*—Philip R. Coe
*Attorney, Agent, or Firm*—Edwin E. Greigg; Ronald E. Greigg

[57] ABSTRACT

A cleaner for piping according to this invention comprises: a nozzle supporting body having first injection holes for allowing the cleaner to be self-propelled in a backward direction of the piping, a nozzle supported by the nozzle supporting body and having a second injection hole for thrusting the cleaner onto the inner wall surface of piping, and a nozzle guide member in the form of an arm, one end of which is fixedly attached to the nozzle, wherein a connecting member is provided at a suitable portion, e.g., the intermediate portion of the nozzle guide member, a blade member for removing residual remaining within piping being attached on one side of the connecting member, a slide member slidable on the inner circumferential wall of piping being attached on the other side of the connecting member.

2 Claims, 9 Drawing Sheets

CLEANER FOR PIPING

BACKGROUND OF THE INVENTION

This invention relates to a cleaner for piping or pipe arrangement used for cleaning a drain or waste pipe of sewage or a drain or waste pipe of building, and more particularly to a cleaning device for piping or pipe arrangement, which is used for removing deposit remaining within a drain or waste pipe, or residual such as root of wood, etc. therewithin.

As one embodiment of an piping cleaner of this kind, there is conventionally known an embodiment shown in FIG. 9 proposed by the inventor of this application, for example.

Namely, this cleaner 1 essentially comprises a nozzle supporting body 3 fixedly attached to an insertion end portion of a cleaning hose 2 adapted to be inserted into a tube, a nozzle 5 supported by the nozzle supporting body and having an injection hole or holes 4 for rotation directed toward the inner wall of the tube, an elongated nozzle guide member one end portion of which is fixedly attached to the nozzle 5, and a spherical slide member 7 attached to the free end portion of the nozzle guide member and slidable on the inner circumferential wall of the tube.

In addition, injection holes 8 permitting the cleaner to be self-propelled in a forward direction are formed in an oblique direction in the nozzle supporting body 3.

In the above-described configuration, however, while the nozzle 5 is guided along the inner circumferential wall of the tube by the nozzle guide member 6, thus making it possible to make cleaning of the inner circumferential wall of piping, there was the drawback that it is impossible to crush or cut deposit attached within piping and/or residual such as root of wood, etc. remaining within piping to positively take out them.

SUMMARY OF THE INVENTION

With the drawbacks with the prior art as described above in view, an object of this invention is to provide a cleaner for piping, which can positively take out deposit attached within piping or residual such as root of wood, etc. remaining within piping.

To achieve the above-mentioned object, a cleaner for piping according to this invention is characterized by the provision of a nozzle supporting body having first injection holes for allowing the cleaner to be self-propelled in a backward direction of the piping, a nozzle supported by the nozzle supporting body and having a second injection hole for thrusting the cleaner onto the inner wall surface of the piping, and a nozzle guide member in the form of an arm, one end of which is fixedly attached to the nozzle, wherein a connecting member is provided at a suitable portion, e.g., the intermediate portion of the nozzle guide member, a blade member for removing residual remaining within piping being attached on one side of the connecting member, a slide member slidable on the inner circumferential wall of the piping being attached on the other side of the connecting member.

BRIEF DESCRIPTION OF THE DRAWINGS

FIGS. 1 to 5 show a first embodiment of this invention wherein
FIG. 1 is a front view,
FIG. 2 is a side elevation viewed from the left,
FIG. 3 is a cross sectional view,
and
FIGS. 4 and 5 are explanatory views of the operating states.
FIGS. 6 to 8 show a second embodiment of this invention wherein
FIG. 6 is a front view,
FIG. 7 is a side elevation viewed from the left,
and
FIG. 8 is a cross sectional view.

DESCRIPTION OF THE PREFERRED EMBODIMENTS

This invention will now be described in detail in accordance with embodiments shown with reference to the attached drawings.

Figure 5:
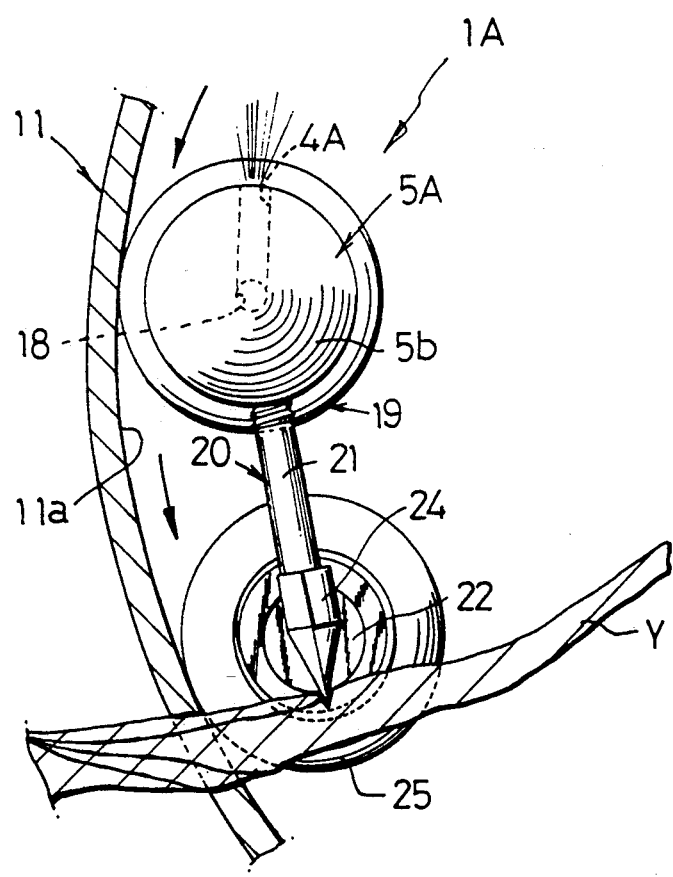

In the first embodiment shown in FIGS. 1 to 5, reference numeral 1A denotes a cleaner. Reference numeral 11 denotes a piping or pipe arrangement such as a drain or waste pipe, or a service water pipe, etc. Reference 2A denotes a cleaning hose having a rear end portion connected to a pump (not shown) provided outside piping, and a front end portion adapted to be inserted into the piping 11. Reference symbol Y denotes a residual such as a root of wood remaining within piping. In FIG. 5, there is shown the state where the root Y of wood is thrust from the outside into the piping.

Figure 1:
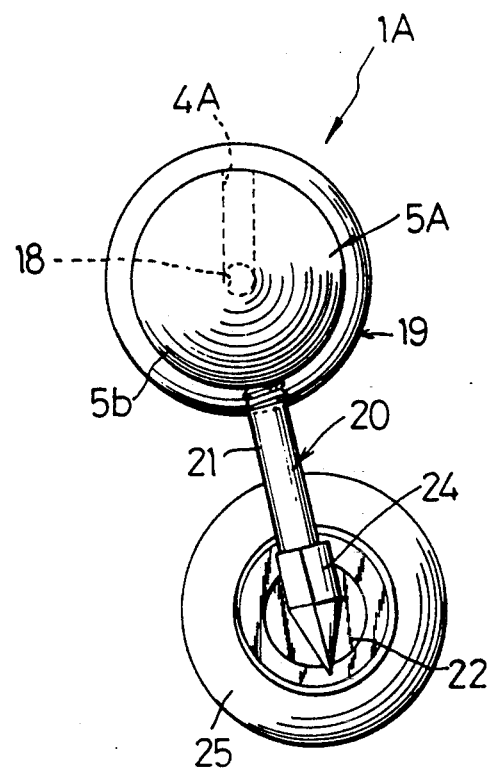
Figure 2:
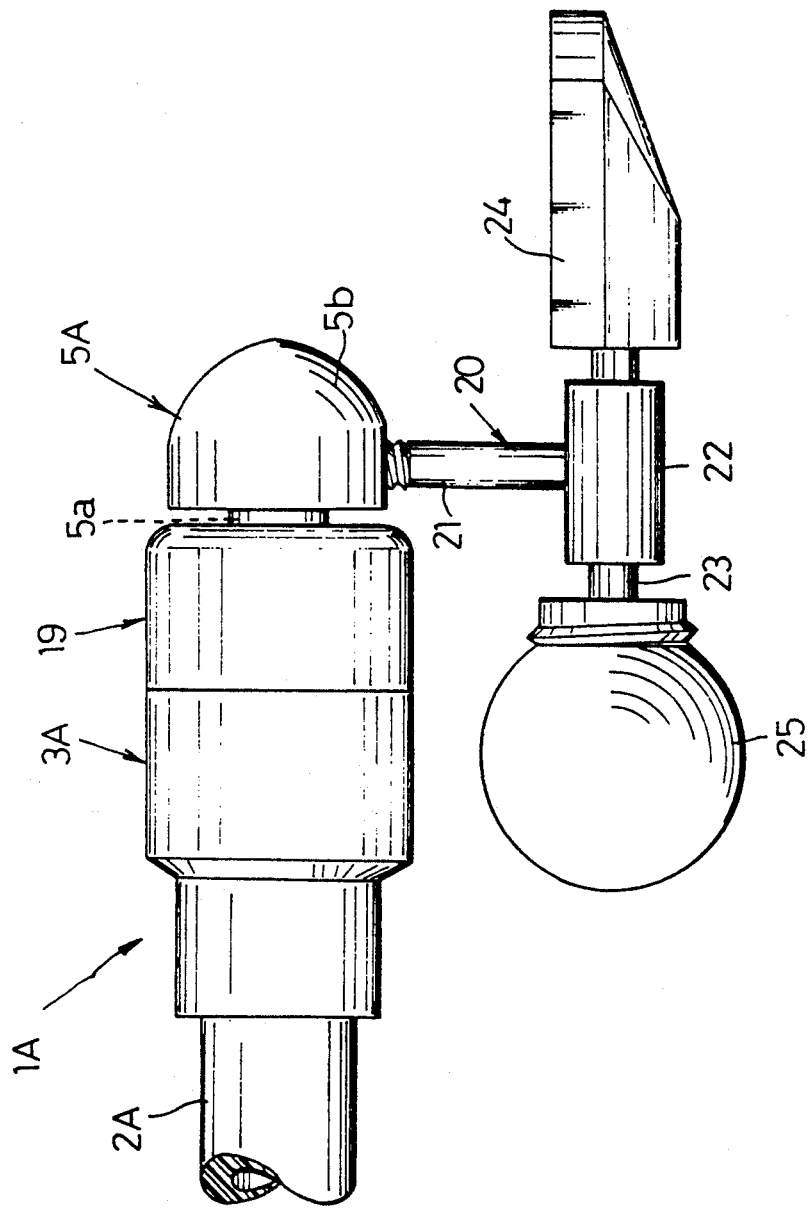
Figure 3:
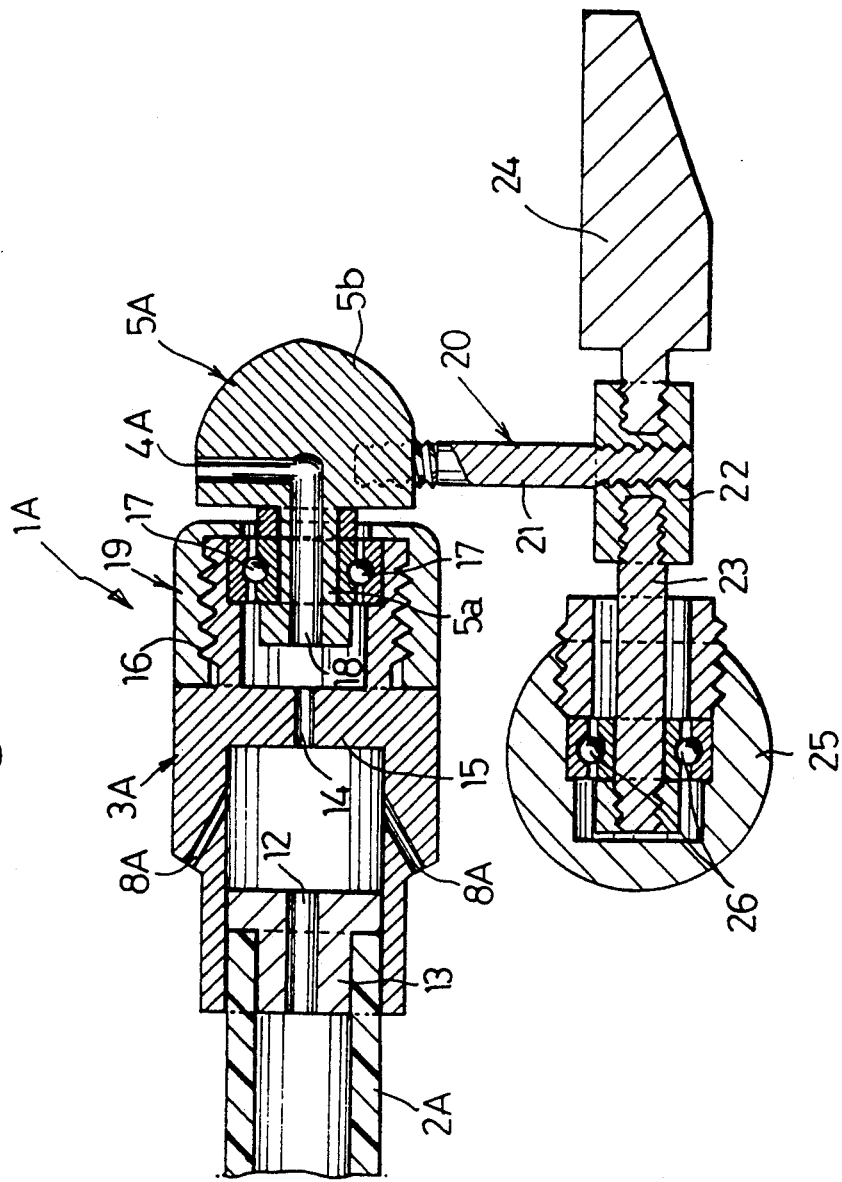
Figure 4:
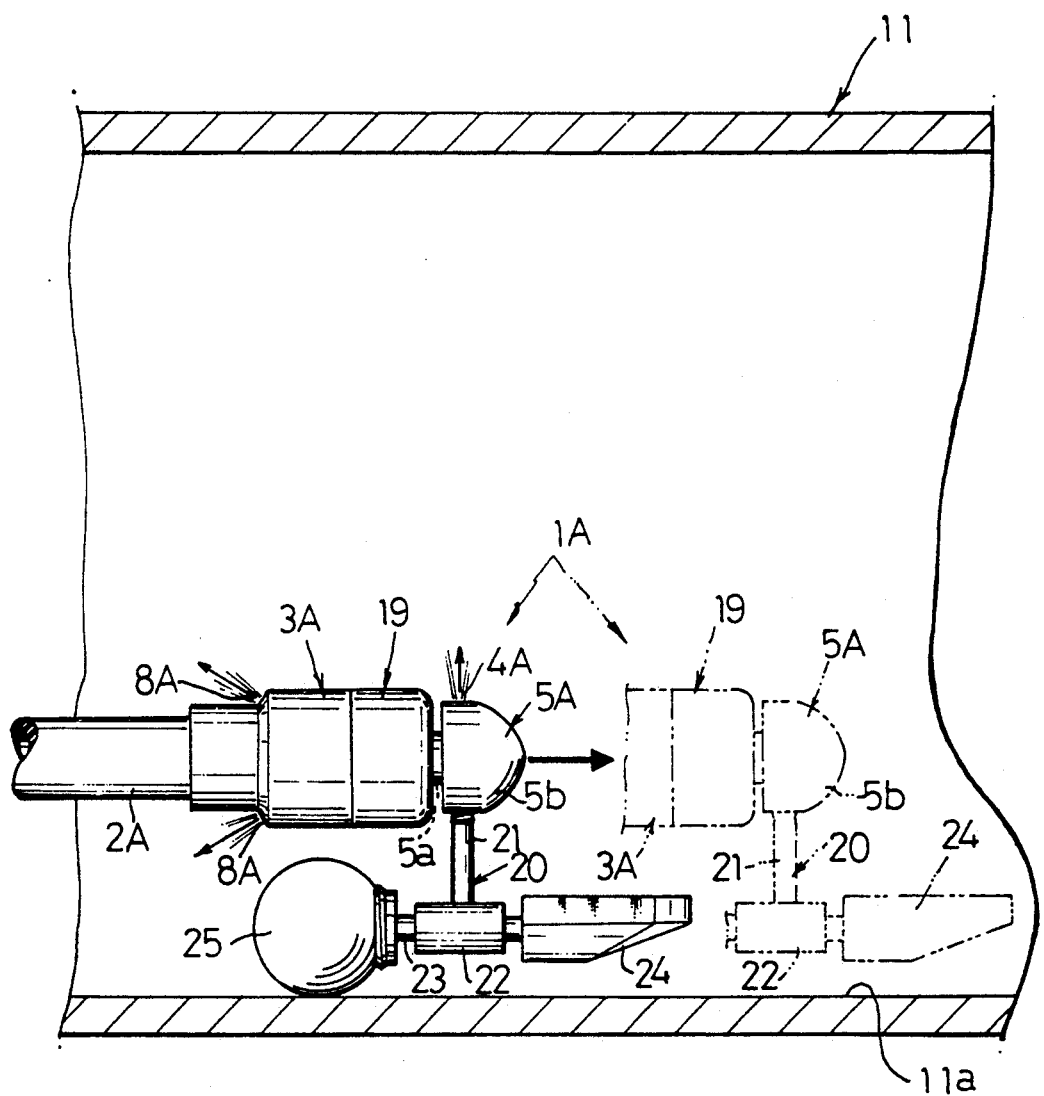

Reference numeral 3A denotes a nozzle supporting body having first injection holes 8A for allowing the cleaner 1A to be self-propelled in a backward direction of the piping 11. In this embodiment, there are formed a plurality of first injection holes 8A obliquely toward the cleaning hose side as shown in FIG. 3.

The nozzle supporting body 3A is formed tubular by metal or hard synthetic resin. To the rear end portion of the nozzle supporting body 3A, the front end portion of the cleaning hose 2A is fixedly attached through a fixing member or fixture 13 having a fluid communication hole 12. Further, a partition wall 15 having a passage or channel 14 is provided within the nozzle supporting body 3A. In addition, male screws 16 are formed at the outer circumferential wall of the front end portion of the nozzle supporting body 3A.

Reference numeral 5A denotes a nozzle supported by the nozzle supporting body 3A through bearing balls 17, and having a second injection hole 4A for thrusting the cleaner 1A onto the inner wall surface 11a of the piping. The second injection hole 4A serves to allow the cleaner 1A to be self-propelled in a circumferential direction of the piping 11. Accordingly, the second injection hole is formed at the portion opposite to the mounting portion of a nozzle guide member which will be described later. The nozzle 5A is comprised of a neck portion 5a supported by bearing balls 17 and a head portion 5b projected from the neck portion.

While the number of second injection holes 4A is arbitrary, it is desirable to form such a second injection hole or holes in a direction crossing with a center hole 18 formed in the neck portion 5a. Further, it is desirable that the previously described passage 14 diameter is smaller than that of the second injection hole 4A.

Reference numeral 19 denotes a tubular cap screw-connected with male screws 16 of the nozzle supporting body in order that the nozzle 5A does not slip off from the nozzle supporting body 3A.

Reference numeral 20 denotes a nozzle guide member in the form of an arm, one end of which is fixedly attached to the head portion 5b of the nozzle. This nozzle guide member directly or indirectly has a blade portion or a blade member for removing residual Y remaining within the piping 11.

More particularly, the nozzle guide member 20 comprises a first rod-shaped arm 21 attached to the head portion 5b of the nozzle 5A in a direction crossing with the nozzle supporting body 3A, and a second rod-shaped arm 23 provided in a horizontal direction with respect to the nozzle supporting body 3A through a connecting member 22 at the lower portion of the first rod-shaped arm 21.

A blade member 24 in a double-edge form for removing residual remaining within the piping is attached on one side of the nozzle guide member 20 through the connecting member 22. Further, a slide member 25 slidable on the inner circumferential wall 11a of the piping is attached on the other side through bearing balls 26, etc.

It is to be noted that, in the above-described embodiment, the blade member 24 and the slide member 25 may be attached so as to have a positional relationship opposite to the above. Further, the blade member 24 may be constructed as a blade member in a form such that a plurality of counters of an abacus are integrally connected. In addition, the blade member 24 may be in a sawtooth form. Accordingly, it should be noted that the shape of the blade member is not an element limiting this embodiment.

In the above-described configuration, when cleaning water of high pressure is delivered into the cleaning hose 2A, cleaning water is first injected from the first injection holes 8A of the cleaner 1A. As a result, the cleaner 1A is caused to be self-propelled in a backward direction of the piping 11 while tracting the cleaning hose 2A. When cleaning water is injected from the second injection hole 4A of the cleaner 1A, the cleaner 1A is thrust onto the inner wall surface 11a of the piping 11. As a result, the slide member 25 of the nozzle guide member 20 comes into contact with the inner wall surface 11a of the piping.

Thus, the cleaner 1A runs along the inner wall surface 11a of the piping while being guided by the nozzle guide member 20. As a result, as shown in FIG. 5, the cleaner strikes or impinges on residual Y such as root of wood, etc. remaining within the piping. When the blade member 24 of the nozzle guide member strikes or impinges on the root of wood, that root of wood is broken or cut. As a result, it is possible to positively take out root of wood thus cut.

A different embodiment of this invention will now be described. In the explanation of this embodiment, the same reference numerals are respectively attached to the same portions as those of the embodiment of this invention, and the repetitive explanation is omitted.

Figure 6:
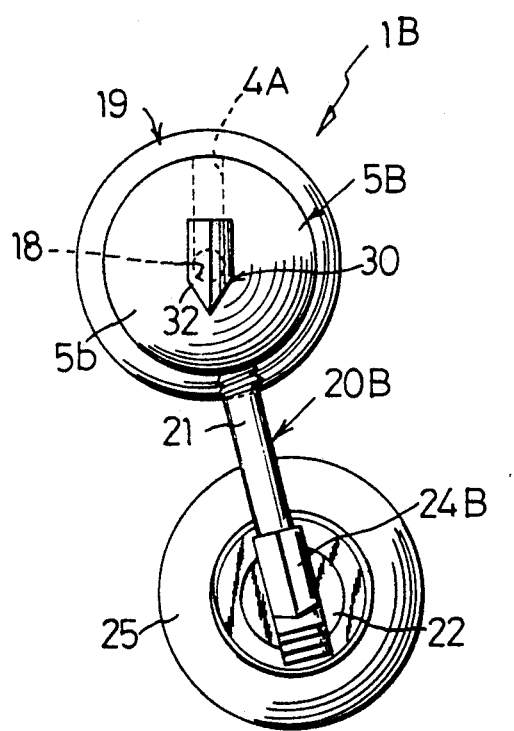
Figure 7:
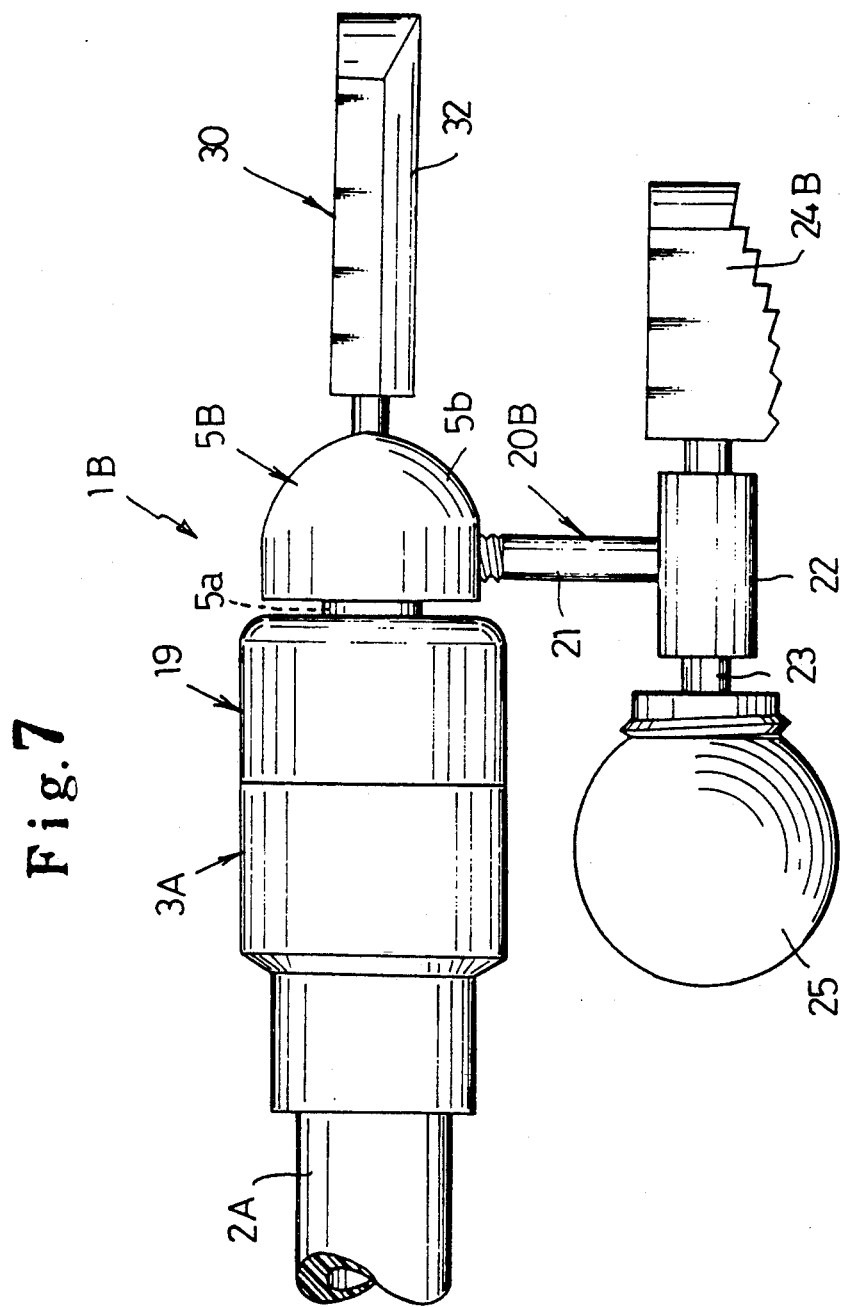
Figure 8:
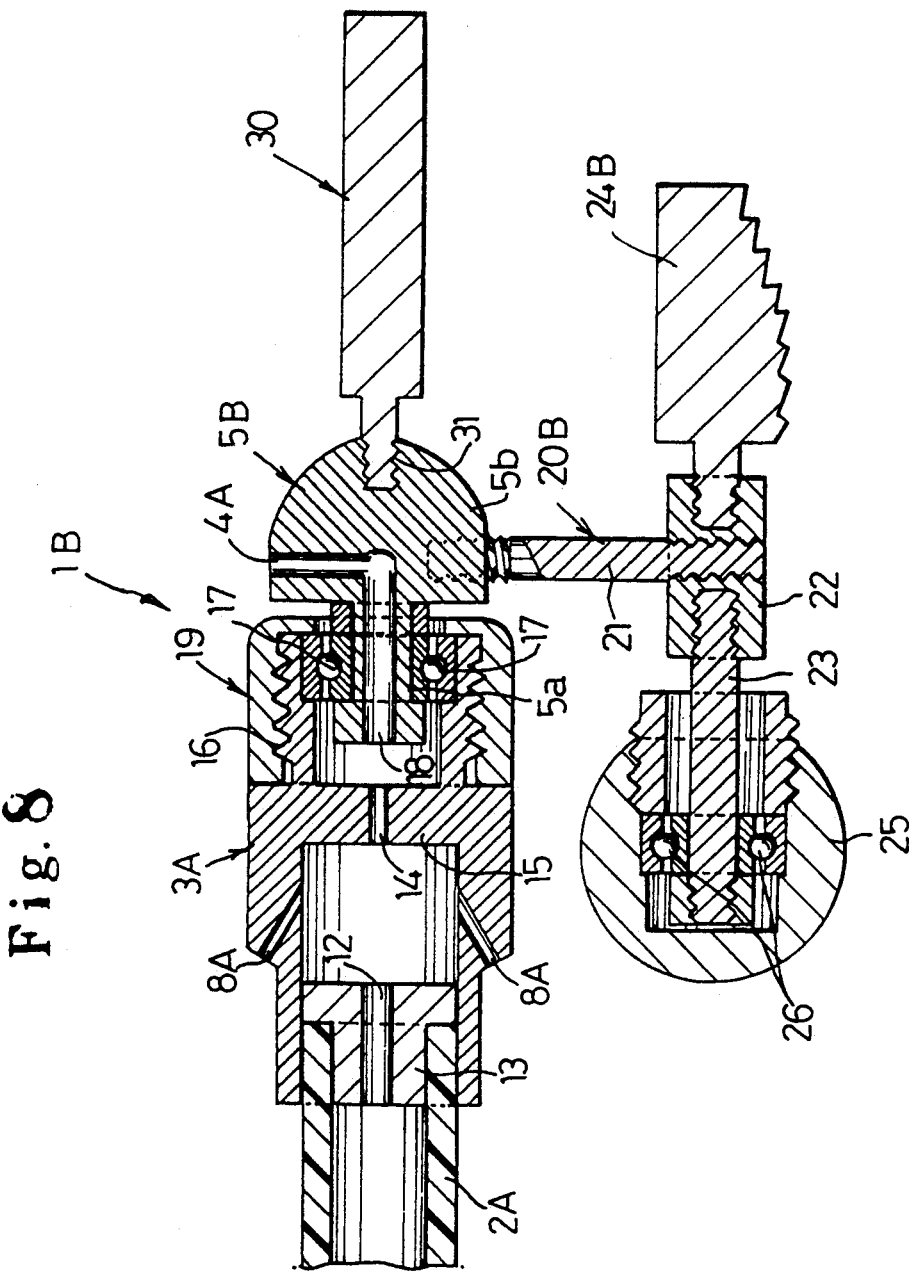
Figure 9:
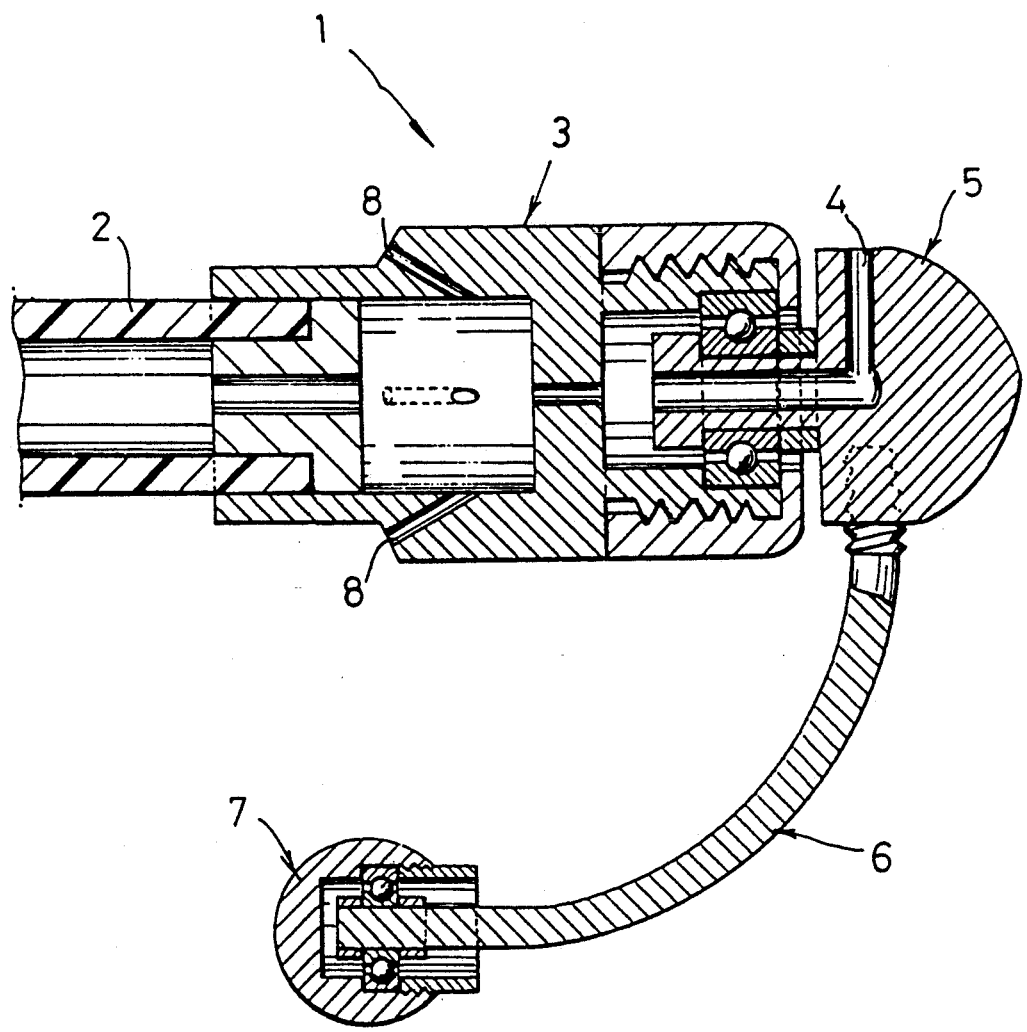
FIG. 9 is an explanatory view showing an example of the prior art.

Cleaner 1B of the second embodiment shown in FIGS. 6 to 8 mainly differs from the cleaner 1A of the first-mentioned embodiment of this invention in that a second blade member 30 for removing residual remaining within piping is attached on the nozzle 5B.

This second blade member 30 is comprised, as shown in FIG. 8, of male screw portions 31 screw-connected with the female screws of the head portion of the nozzle 5B, and a blade portion 32 in a double-edged form integrally provided with the male screw portions 31.

Further, the first blade member 24B is in a saw-tooth form.

When the cleaner is constructed as above, the first blade member 24B of the nozzle guide member 20B and the second blade member 30 of the nozzle 5B can efficiently crush or cut residual remaining within the piping in such a manner that both members are cooperative with each other.

As is clear from the foregoing description, in accordance with this invention, the cleaner runs along the inner wall surface of the piping while being guided by the nozzle guide member, and strikes or impinges on, as shown in FIG. 5, residual such as root of wood, etc. remaining within the piping. Accordingly, since the blade member of the nozzle guide member strikes or impinges on root of wood, that root of wood is broken or cut. As a result, it is possible to positively take out the root of wood thus cut.

What is claimed is:

1. A cleaner for a pipe comprising:
   a nozzle supporting body having first injection holes for directing cleaning water onto an inner circumferential wall surface of said pipe and for forcing the cleaner to be self-propelled in a forward direction toward an uncleaned forward end of the piping,
   a nozzle supported by the nozzle supporting body through first bearing balls and having a second injection hole for thrusting the cleaning water onto the inner circumferential wall surface of the pipe approximately perpendicular thereto, and
   a nozzle guide member in the form of an arm, one end of which is fixedly attached to the nozzle,
   a connecting member is provided at a suitable portion of the nozzle guide member, at least one forwardly directed cutting blade member attached on one side of the connecting member for removing residuals remaining within the pipe, a slide member slidable on the inner circumferential wall of the pipe being attached through bearing balls on another side of the connecting member, and said second injection hole is formed at a portion of said nozzle supporting body opposite to the mounting portion of said nozzle guide member.

2. A cleaner for a pipe as set forth in claim 1, which includes a second forwardly directed cutting blade for removing residuals within said pipe.

* * * * *